(12) United States Patent
Hamid

(10) Patent No.: US 7,272,247 B2
(45) Date of Patent: Sep. 18, 2007

(54) METHOD AND SYSTEM FOR FINGERPRINT AUTHENTICATION

(75) Inventor: Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 448 days.

(21) Appl. No.: 09/973,011

(22) Filed: Oct. 10, 2001

(65) Prior Publication Data

US 2003/0068072 A1 Apr. 10, 2003

(51) Int. Cl.
*G06K 9/00* (2006.01)

(52) U.S. Cl. ..................................... 382/124

(58) Field of Classification Search ........ 882/115–127; 840/5.52–5.53, 5.81–5.84; 300/383–384; 396/15; 902/3; 283/68–69
See application file for complete search history.

(56) References Cited

U.S. PATENT DOCUMENTS

| | | | |
|---|---|---|---|
| 5,109,427 A | | 4/1992 | Yang |
| 5,109,428 A | * | 4/1992 | Igaki et al. ................. 382/125 |
| 5,187,482 A | | 2/1993 | Tiemann et al. |
| 5,187,748 A | | 2/1993 | Lee |
| 5,233,404 A | | 8/1993 | Lougheed et al. |
| 5,493,621 A | * | 2/1996 | Matsumura ................. 382/125 |
| 5,815,252 A | | 9/1998 | Price-Francis |
| 5,963,656 A | * | 10/1999 | Bolle et al. ................. 382/124 |
| 5,978,495 A | * | 11/1999 | Thomopoulos et al. ..... 382/124 |
| 5,995,640 A | * | 11/1999 | Bolle et al. ................. 382/124 |
| 6,005,963 A | * | 12/1999 | Bolle et al. ................. 382/124 |
| 6,064,753 A | * | 5/2000 | Bolle et al. ................. 382/125 |
| 6,072,895 A | * | 6/2000 | Bolle et al. ................. 382/125 |
| 6,131,464 A | * | 10/2000 | Pare et al. ..................... 73/714 |
| 6,185,318 B1 | | 2/2001 | Jain et al. |
| 6,241,288 B1 | | 6/2001 | Bergenek et al. |
| 6,263,091 B1 | | 7/2001 | Jain et al. |
| 6,330,345 B1 | * | 12/2001 | Russo et al. ................ 382/115 |
| 6,535,622 B1 | * | 3/2003 | Russo et al. ................ 382/124 |
| 6,718,052 B1 | * | 4/2004 | Matsumoto et al. ........ 382/125 |
| 6,763,127 B1 | * | 7/2004 | Lin et al. .................... 382/125 |
| 6,845,173 B2 | * | 1/2005 | Takahashi ................... 382/124 |
| 6,876,757 B2 | * | 4/2005 | Yau et al. .................... 382/125 |
| 6,983,062 B2 | * | 1/2006 | Smith ......................... 382/124 |
| 7,072,523 B2 | * | 7/2006 | Bolle et al. ................. 382/124 |
| 2001/0036300 A1 | * | 11/2001 | Xia et al. ..................... 382/125 |

OTHER PUBLICATIONS

U.S. Appl. No. 60/293,487, filed May 25, 2001 (provisional of US 6,876,757 by Yau et al.).*

* cited by examiner

*Primary Examiner*—Colin LaRose
(74) *Attorney, Agent, or Firm*—Woodcock Washburn LLP

(57) ABSTRACT

An improved method and system for reading and analyzing fingerprints is disclosed. According to the present invention, fingerprints are scanned and then analyzed to determine a value in dependence upon a predetermined acquisition parameter, such as for instance one of a moisture content of the fingertip and an applied fingertip pressure. The scanned fingerprint is subsequently processed to remove "false minutiae" in dependence upon the determined value, whilst retaining authentic minutiae for user authentication. Processing the fingertip to determine a condition thereof prior to image processing results in a more selective removal of minutiae, thus resulting in a larger set of minutiae being retained for comparison to a stored biometric template.

51 Claims, 12 Drawing Sheets

METHOD AND SYSTEM FOR FINGERPRINT AUTHENTICATION

FIELD OF THE INVENTION

This invention relates generally to imaging devices and more particularly to an improved method and system for reading and analyzing fingerprints.

BACKGROUND OF THE INVENTION

Various optical devices are known which employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access or information-access of individuals to buildings, rooms, and devices such as computer terminals.

One of the problems associated with fingerprint sensors concerns the reliable and accurate transformation of the ridge-and-valley pattern of the fingertip into electrical or optical signals to be stored in a digital format. Optical systems as described above, for example using a prism, require sophisticated equipment and tend to be bulky and costly.

In an attempt to overcome some of the limitations and disadvantages of using optical systems based on illumination of the finger tip, U.S. Pat. No. 4,353,056 in the name of Tsikos issued Oct. 5, 1982, discloses an alternative kind of fingerprint sensor that uses a capacitive sensing approach. The described sensor has a two dimensional, row and column, array of capacitors, each comprising a pair of spaced electrodes, carried in a sensing member and covered by an insulating film. The sensors rely upon deformation to the sensing member caused by a finger being placed thereon so as to vary locally the spacing between capacitor electrodes, according to the ridge-and-valley pattern of the fingerprint, and hence, the capacitance of the capacitors. In one arrangement, the capacitors of each column are connected in series with the columns of capacitors connected in parallel and a voltage is applied across the columns. In another arrangement, a voltage is applied to each individual capacitor in the array. Sensing in the respective two arrangements is accomplished by detecting the change of voltage distribution in the series connected capacitors or by measuring the voltage values of the individual capacitances resulting from local deformation. To achieve this, an individual connection is required from the detection circuit to each capacitor.

While the described sensor may not suffer from the problems associated with the kind of sensor employing an optical sensing technique, it suffers from its own problems. For example, applying a voltage to the array of capacitors requires circuitry to each capacitor for charging. Such charging also requires further states in the imaging process consuming more resources and providing added areas for unreliability. Moreover, the need to provide a respective connection to each individual capacitor in the array means that a very large number of connecting lines is necessary. This creates difficulties, both in the fabrication of the sensing member and its interconnection with the detection circuit.

In yet another attempt to improve upon deficiencies and limitations of the aforementioned and other prior art, a further contact imaging device is described in U.S. Pat. No. 5,325,442 in the name of Knapp, issued Jun. 28, 1994. Those parts of the disclosure of this patent not included in this specification are incorporated herein by reference.

Knapp describes making a capacitance measuring imaging device in the form of a single large active matrix array involving deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

A fingerprint sensing device and recognition system that includes an array of closely spaced apart sensing elements each comprising a sensing electrode and an amplifier circuit is described in U.S. Pat. No. 5,778,089 in the name of Borza, issued Jul. 7, 1998. The device is used to sense electrical charge on a fingertip and obviates the need to pre-charge the sensing electrode. The device may be constructed with a single die or with multiple dies. Those parts of the disclosure of this patent not included in this specification are incorporated herein by reference.

Fingerprint analysis is perhaps the most widely used and studied biometric technique. The analysis of fingerprints is discussed in the following references which are hereby incorporated by reference:

Xiao Qinghan and Bian Zhaoqi,: An approach to Fingerprint Identification By Using the Attributes of Feature Lines of Fingerprint," IEEE Pattern Recognition, pp 663, 1986;

C. B. Shelman, "Fingerprint Classification—Theory and Application," Proc. 76 Carnahan Conference on Electronic Crime Countermeasures, 1976;

Feri Pernus, Stanko Kovacic, and Ludvik Gyergyek, "Minutiae Based Fingerprint Registration," IEEE Pattern Recognition, pp 1380, 1980;

J. A. Ratkovic, F. W. Blackwell, and H. H. Bailey, "Concepts for a Next Generation Automated Fingerprint System," Proc. 78 Carnahan Conference on Electronic Crime Countermeasures, 1978;

K. Millard, "An approach to the Automatic Retrieval of Latent Fingerprints," Proc. 75 Carnahan Conference on Electronic Crime Countermeasures, 1975;

Wegstein, *An Automated Fingerprint Identification System,* NBS special publication, U.S. Department of Commerce/National Bureau of Standards, ISSN 0083-1883; no. 500-89, 1982; and Moenssens, Andre A., *Fingerprint Techniques,* Chilton Book Co., 1971; and, Wegstein and J. F. Rafferty, *The LX39 Latent Fingerprint Matcher,* NBS special publication, U.S. Department of Commerce/National Bureau of Standards; no. 500-36, 1978.

Typically in electronic fingerprint matching, a live fingerprint is scanned and electronically digitized. The digitized data generally contains information pertaining to characteristic features of the fingerprint, such as ridge endings, points of ridge bifurcation, and the core of a whorl i.e., fingerprint minutiae. The digitized data is then compared with stored data relating to fingerprints that have been obtained previously from corresponding authorized persons i.e., fingerprint templates. When a match is detected, within a predetermined level of security in the form of a predetermined false acceptance rate, the individual is identified and a corresponding action is performed.

In general, there are two types of errors associated with fingerprint identification. The first is false reject (Type I) error and the second is false accept (Type II) error. False accept errors occur when there are enough similarities between fingerprints of two individuals, that one is mistaken for the other. A false reject error occurs for a variety of reasons, and refers to when an individual is not identified even though the individual is an authorized user registered with the system.

A moisture dependent variation of the ridge-and-valley pattern of a same fingertip often leads to an increased incidence of Type I errors, which causes undue inconvenience to users of a fingerprint identification system. For instance, seasonal weather patterns, high levels of physical exertion, the user wearing gloves to warm his hands, etc. can cause a fingertip to be excessively dry or excessively moist relative to a template fingerprint that was provided during an initial enrollment operation. A warm, moist fingertip tends to be swollen slightly, such that adjacent ridges are pushed more closely together and may connect (a ridge interconnect). Further, the fingerprint identification system may mistakenly register sweat or moisture that is trapped within a valley as a fingertip ridge. In contrast, a cool, dry fingertip tends to be constricted slightly, such that portions thereof fail to make proper contact with the imaging surface, causing the fingerprint identification system to register gaps or discontinuities where there is in fact a continuous ridge. Of course, when a sample image from one of a moist and a dry fingertip is compared to a reference image obtained previously under ideal conditions, there is an increased likelihood that the user will be falsely rejected.

U.S. Pat. No. 6,241,288, issued Jun. 5, 2001 to Bergenek et al., teaches a fingerprint identification/verification method using stored bitmap images of a reference fingerprint to correlate with a bitmap image of an input fingerprint. The method includes a user enrollment step, during which step an imaging device captures a binarized reference image of a fingerprint presented by the user. The binarized reference image is checked for 'dryness' or 'wetness' as part of a quality control portion of the enrollment step. If the image is 'too dry', the pressure applied to the sensor was too light or the sensor failed to detect parts of ridges because of fingertip dryness. If the image is 'too wet', moisture on the fingertip 'flooded' the fingerprint valleys. Wetness or dryness is detected by analyzing the image for too few dark pixels (dryness) or, too many dark pixels and continuous dark areas (wetness). If the reference image is rejected, the person is asked to correct the problem and another reference image is taken. Optionally, the input fingerprint is subjected to a similar quality control process during a recognition step of the method, for instance when the user wishes to be authenticated. Unfortunately, the onus is on the user to correct the problem, causing the user to suffer inconvenience unnecessarily.

U.S. Pat. No. 6,131,464, issued Oct. 17, 2000 to Pare, Jr. et al., discloses a pressure sensitive biometric input apparatus and a method of operating same. An image of a fingertip under investigation is captured at an imaging area of the apparatus. If the image is too dark, the pressure at which the image was scanned is examined. If the pressure is at the higher end of a predetermined pressure range, a preferred embodiment of the invention instructs the user to use less pressure, postulating that the user might have well-defined ridges and a decrease in pressure might well lighten the image to an acceptable level. Otherwise, an embodiment of the invention concludes that the most likely cause of the problem is too much moisture, and instructs the user to dry his or her finger and retry the scan. Unfortunately, the user must attempt multiple fingerprint scans before an acceptable match is obtained. Further unfortunately, the onus is on the user to correct the problem, causing the user to suffer inconvenience unnecessarily.

It would be advantageous to provide a method and a system to process data indicative of a fingerprint image and to determine a value in dependence upon a moisture level thereof, prior to attempting user authentication. The determined value for selecting a particular reference fingerprint of a plurality of reference fingerprints, each of the plurality of reference fingerprints obtained at a known fingertip moisture state.

OBJECT OF THE INVENTION

Thus, in an attempt to overcome these and other limitations of known prior art devices, it is an object of this invention to provide a method of biometric identification that is robust.

It is a further object of the invention to provide a method of detecting a characteristic of a biometric surface for use in identification of an individual.

SUMMARY OF THE INVENTION

In accordance with the present invention there is provided a method for fingerprint authentication comprising the steps of:

a) acquiring an image of a fingertip;

b) processing the image to determine a value indicative of a predetermined acquisition parameter thereof;

c) comparing the image to a stored biometric template, the comparison process based on the determined value; and, d) performing one of an authentication and a rejection in dependence upon the comparison.

In accordance with the present invention there is provided another method for processing a fingerprint image comprising the steps of:

a) acquiring an image of a fingertip;

b) processing the acquired image to determine a value indicative of a predetermined acquisition parameter thereof; and, c) selecting an image-processing process in dependence upon the determined value, the image-processing process for removing a subset of features of the acquired image.

In accordance with the present invention there is provided yet another method for fingerprint authentication comprising the steps of:

a) acquiring an image of a fingertip;

b) processing the acquired image to determine a value indicative of a predetermined acquisition parameter thereof;

c) processing the acquired image according to a predetermined image-processing process to remove a subset of features from the acquired image;

d) selecting a biometric template in dependence upon the determined value, the biometric template processed according to the predetermined image-processing process;

e) comparing the processed acquired image to the biometric template; and, f) performing one of an authentication and a rejection in dependence upon the comparison.

In accordance with the present invention there is provided a system for fingerprint authentication comprising:

a sensing area for capturing an image of a fingertip presented thereto;

a memory storage area for storing captured images therein; and, a processor for executing code thereon to process the captured image to determine a value indicative of an acquisition parameter thereof, and to compare the captured image to a template image according to an image-processing process selected in dependence upon the determined value.

BRIEF DESCRIPTION OF THE DRAWINGS

Exemplary embodiments of the invention will now be described in conjunction with the following drawings, in which similar reference numbers designate similar items.

DETAILED DESCRIPTION OF THE INVENTION

A prior art sensing device that is suitable for use with the instant invention comprises a substantially flat surface for receiving a fingertip. Below the surface are a sensor array and a measuring array. The arrays comprise sensing elements that are designed to sense induced electrical charge. The distance between the fingertip and individual sensing elements should generally be kept to a very small gap in order to retain a high signal to noise ratio. Optionally, the surface for receiving the fingertip is curved, such as for instance a rotatably mounted cylindrical roller for sensing a fingertip swiped in a direction transverse to a longitudinal axis thereof. Further optionally the surface for receiving the fingertip comprises a plurality of separate sensor arrays.

Figure 1:
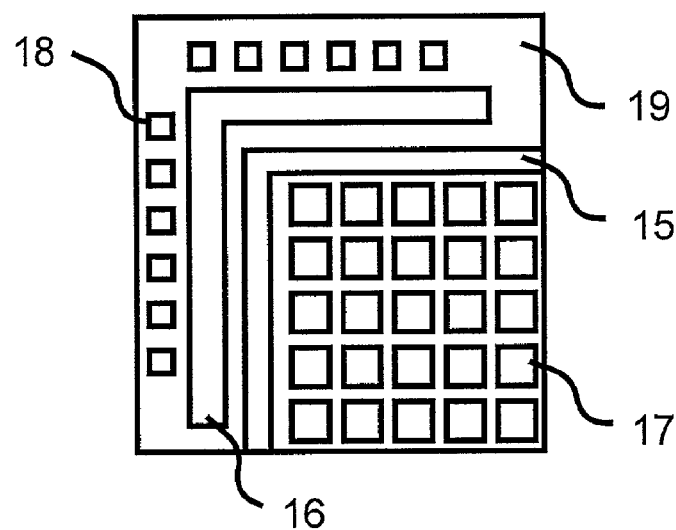
FIG. 1 is a simplified diagram of a prior art sensing device showing an array of sensing elements together with associated addressing circuitry, the size of the sensing device surface is consistent with the size of the surface to be sensed.

Referring to FIG. 1, part of a prior art sensing device for use with the present invention is shown. The device comprises a single active matrix addressed sensing pad 19 having an X-Y array of sense elements having r rows (1 to r) each having c sensing elements 17. In practice there are about 300 rows and 200 columns of regularly spaced elements 17 occupying an area of approximately 2 cm×3 cm. This area is for accepting a fingertip for scanning.

Preferably sensing elements 17 are disposed in such a fashion that a smallest desired feature of a fingerprint is evident in the sensed data. The placement and spacing of the sensor elements allows an image of a fingerprint, once scanned, to contain all required features for analysis. A sensing element 17 is preferably smaller than half the smallest sensable feature size in order to generate such an image. Empirical studies have shown that a square plate of about 50 µm edge length is suitable for fingerprint sensing.

The array of sensing elements 17 is connected through an analog switch matrix to facilitate reading the fingerprint image out of the sensing pad 19. Timing and sequencing logic 16 selects each element in the array, in turn, to produce a complete image of a fingerprint presented to the device. The signal is output directly as an analog signal or, alternatively, is converted to a digital signal prior to output from the device.

The sensing pad 19 further comprises a ground ring 15 and bonding pads 18 designed for connection to other components or to packaging. The ground ring 15 also serves to provide a common ground for the sensing pad. In this role, it is important that the ground ring 15 and integrated circuit elements be designed so as to minimize noise to each sensing element 17. The signal to noise ratio that is acceptable varies between applications and should be adjusted to meet the needs of a specific design. When possible, packaging should be selected to limit noise.

Figure 2:
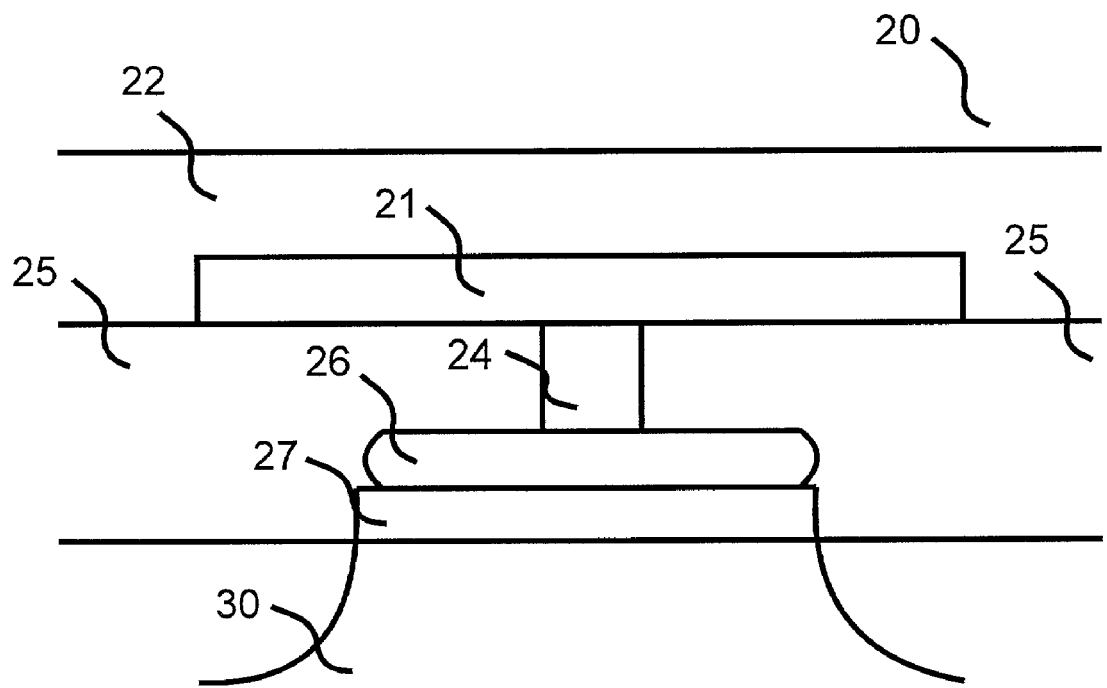
FIG. 2 is a simplified diagram of a prior art sensing element.

Referring to FIG. 2, a prior art single sensing plate 20 is shown. Such a sensing plate 20 is designed for use in arrays and is smaller than half the smallest sensable feature size as indicated above. Charge sensing electrode 21 is connected to an active element, shown as a three terminal switching device in the form of a field effect transistor (FET) having a source, a drain, and a gate 26. The gate 26 is connected to the sensing electrode 21 by an interconnect 24. Disposed between the gate 26 and the transistor 30 is a gate oxide 27.

Above the charge sensing electrode 21 is disposed an overglass 22 which serves to protect the charge sensing electrode 21 and to space the electrode and a fingertip presented thereto. Below the charge sensing electrode 21 is disposed a field oxide 25. A finger placed against the overglass 22 induces charge in the charge sensing electrode 21. The charge so induced is greater for portions of the fingertip that are in contact with the overglass 22—ridges—than for those portions of the fingertip spaced from the overglass 22—valleys. By amplifying the charges so induced with an amplifier circuit such as is shown in FIG. 3, the induced charges are rendered easily distinguishable.

Assuming that the charge density on the fingertip is substantially even, induced charges on the charge sensing electrode 21 depend solely on the distance between the charge sensing electrode 21 and the skin of the fingertip inducing the charge. Further, as the induced charge falls off with the distance, the closest skin of the fingertip will induce a larger proportion of the charge.

Figure 3:
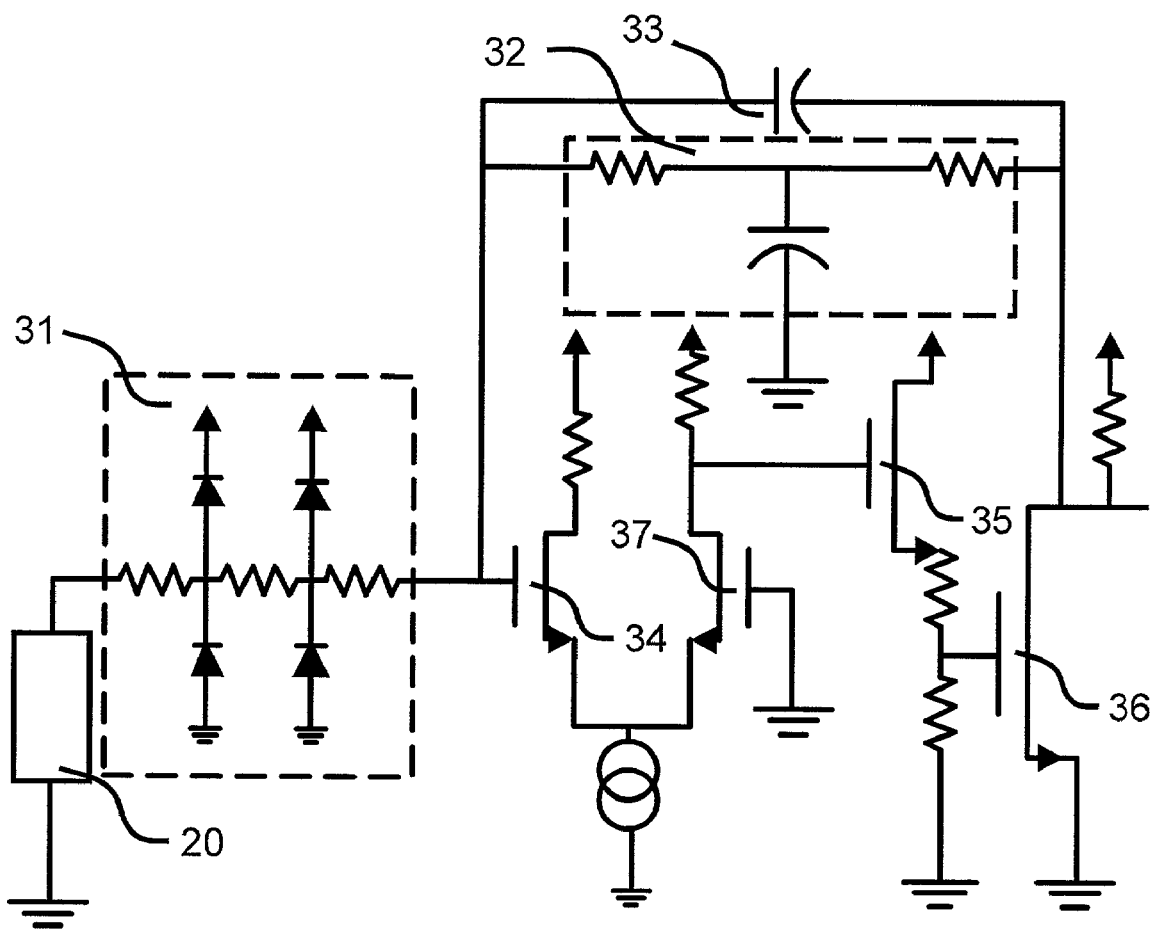
FIG. 3 is a schematic diagram of an amplifier circuit in the form of a differential amplifier for use with the prior art sensing element.

Referring to FIG. 3, an amplifier circuit for use with the instant invention is disclosed. Other suitable amplifier circuits may also be used. A distributed diode resistor network 31 is used to protect the amplifier circuit from electrostatic discharge. A low pass filter network 32, shown as a combination of two resistors and a capacitor stabilizes the DC operating point without impacting AC gain of the amplifier circuit. Any low pass filter circuit with similar characteristics may be employed. The cutoff frequency of the filter is set well below 1 Hz to keep gain high for slowly varying signals.

Capacitor 33 having a capacitance of $C_f$ provides feedback necessary to convert the input charge to a proportional voltage. Sensitivity of the amplifier in its passband is set by the choice of $C_f$ as $V_o=Q_i/C_f$, where $Q_i$ is the input charge at sense electrode 20. For example, at $C_f=0.2$ pF, sensitivity of approximately 5 V/pC is achieved. In practice, the capacitance of the input transistor 34 and protection network 31 attenuates the signal, which affects the final design gain of the amplifier and choice of feedback capacitance $C_f$. Thus, it is suggested that some tuning of the circuit be performed during design.

Amplifiers 35 and 36 and associated circuitry provides level shifting and additional voltage gain. Output signals from the amplifier 36 are selectively switched by on-chip sequential control logic similar to that used in solid state serial memory devices to produce a serialized stream of output signals corresponding to an output of each sensing element 20 at discrete points in time. Alternatively, the output signal from the amplifier is switched by random access logic as is used in random access memory devices and then digitized. The order of the switching and the digitizing may be reversed but so doing requires more logic and is thus more costly.

Figure 4A:
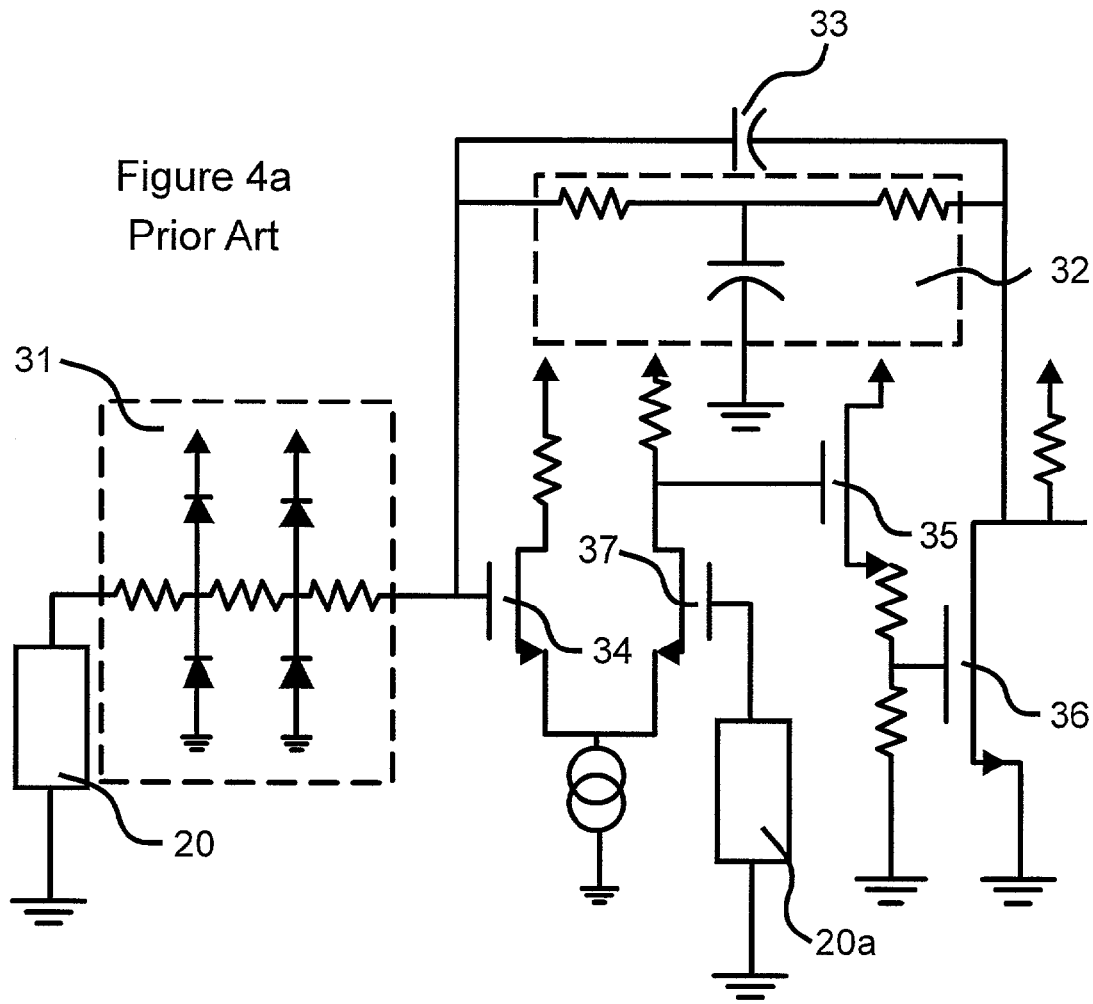
FIG. 4a is a schematic diagram of an alternative amplifier circuit in the form of a differential amplifier for use with the prior art sensing element.

Two alternative embodiments for the amplifier circuit are shown in FIG. 4. FIG. 4a shows a true differential amplifier. Though similar to the amplifier circuit of FIG. 3, the transistor 37 is connected to at least an adjacent sensing element 20a. In practice, such a differential amplifier circuit reduces common mode voltages thereby increasing resolution. In FIG. 3, the transistor 37 is connected to ground providing a virtual reference of ground. Thus the circuit of FIG. 3 measures all induced voltages relative to a ground including any common mode voltage induced. Preferably, the ground is a common ground in the form of the ground ring 15. When using the circuit of FIG. 4a with multiple adjacent sensing elements used as a reference, complexity is introduced to the amplifier and potentially added cost.

Figure 4B:
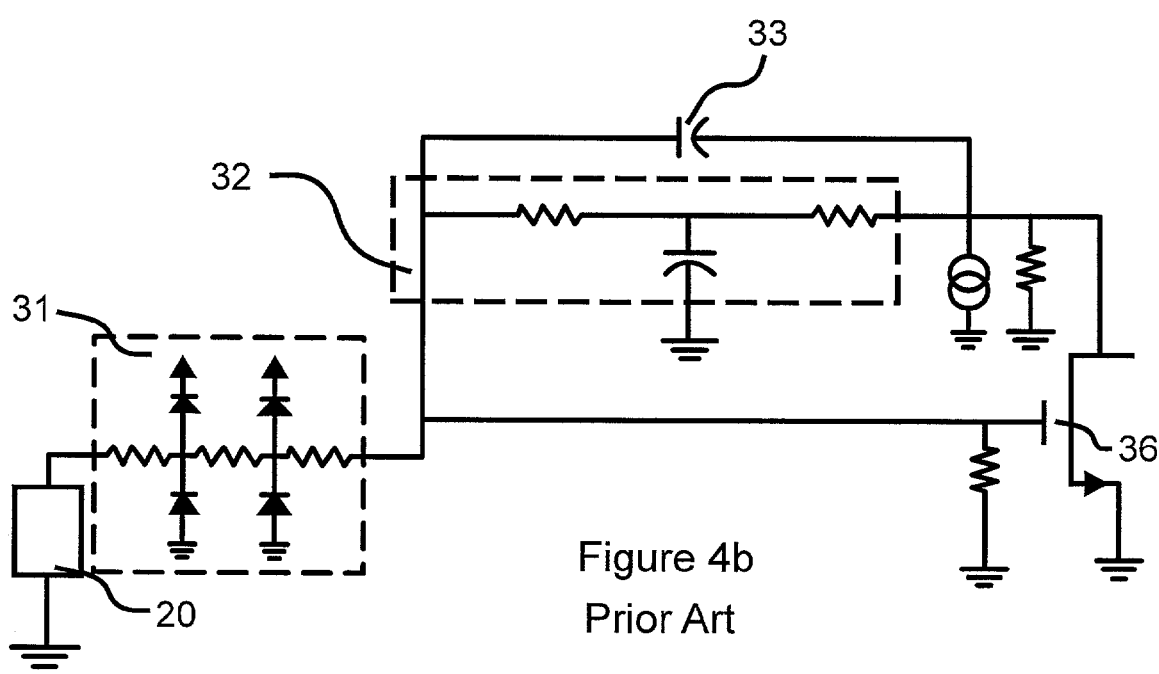
FIG. 4b is a schematic diagram of an alternative amplifier circuit for use with the prior art sensing element.

FIG. 4b shows another alternative embodiment for the amplifier circuit. This circuit is very simple and similar to amplification of a current source. By treating the induced charge on the sensing elements as a current source, the number of transistors required is minimized and the yield is effectively increased. The overall circuit comprises electrostatic protection circuitry 31, a low pass filter 32, and an amplifier circuit.

In use the differential amplifier circuit obviates a need to apply a predetermined initial charge to a sensing electrode. Avoiding the initial charging of the sensing electrode simplifies the overall circuit and removes some sources of noise caused by added circuitry necessary for accomplishing the initial charging.

Figure 5A:
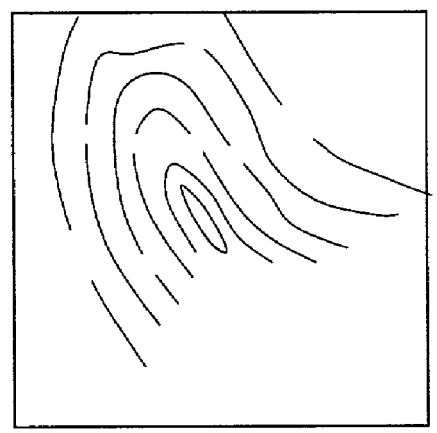
FIG. 5a is a schematic illustration of a 'dry' fingerprint image having numerous ridge discontinuities.
Figure 5B:
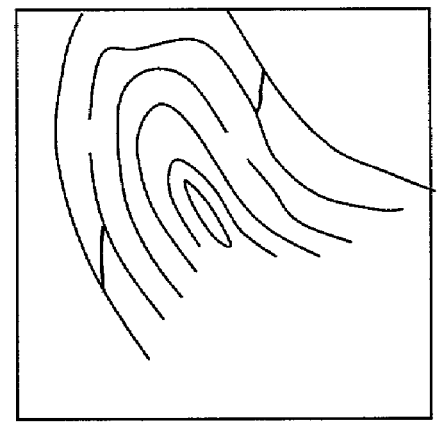
FIG. 5b is a schematic illustration of a 'normal' fingerprint image having a few ridge discontinuities and a few ridge interconnections.
Figure 5C:
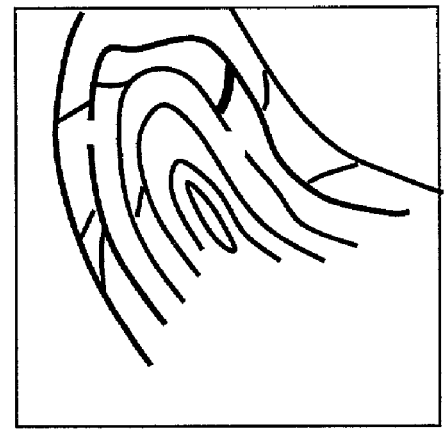
FIG. 5c is a schematic illustration of a 'moist' fingerprint image having numerous ridge interconnections.
Figure 6:
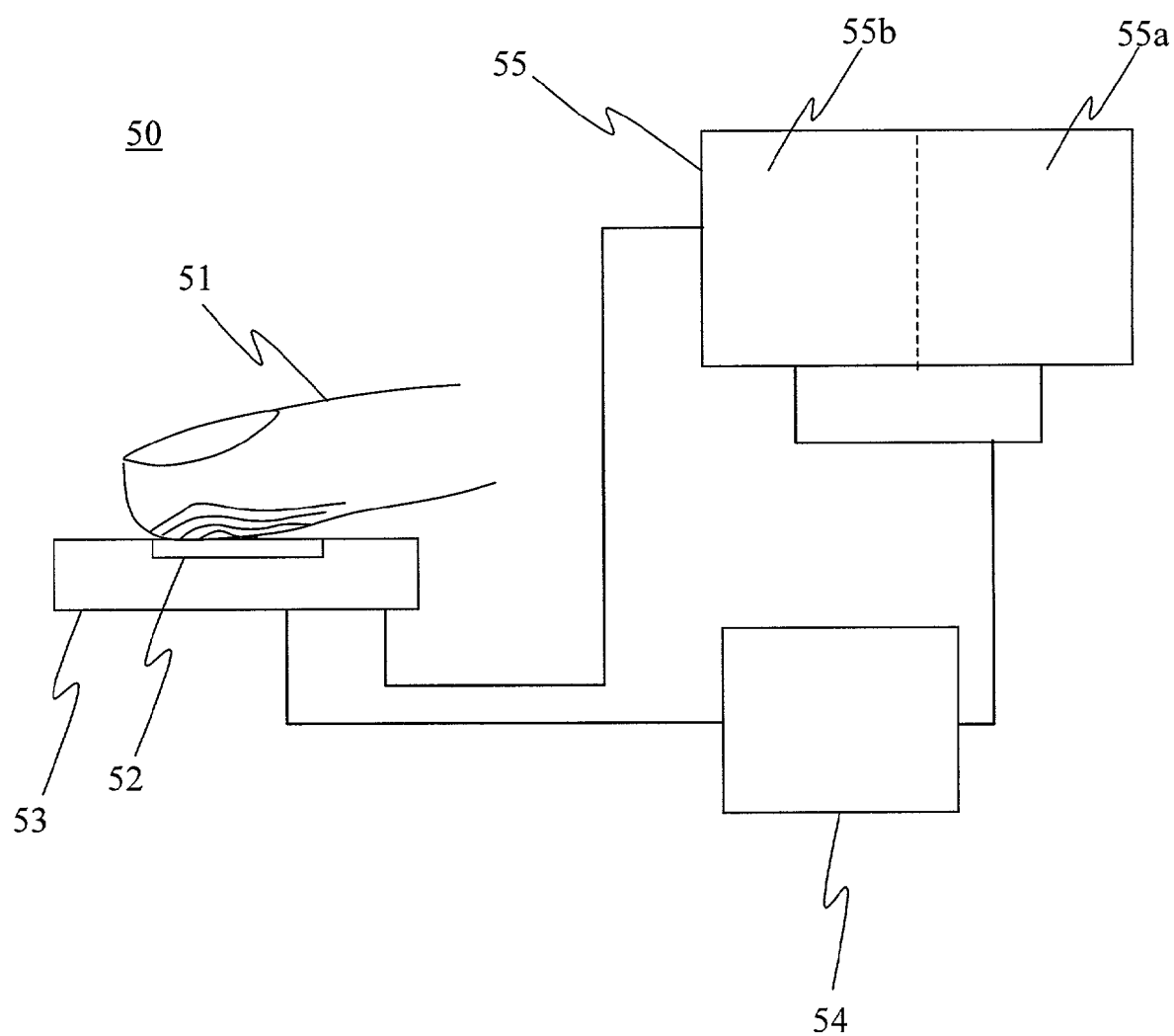
FIG. 6 is a simplified block diagram of a fingerprint identification/verification system according to the instant invention.

Referring to FIG. 5a-c, shown are exemplary 'dry', 'normal' and 'moist' fingerprint images, respectively. As will be obvious to one of skill in the art, features of a fingerprint vary in dependence upon acquisition parameters thereof, such as for instance the moisture condition of the fingertip. For instance, a 'dry' fingerprint as is shown in FIG. 5a typically includes relatively more ridge discontinuities compared to a 'moist' fingerprint as is shown in FIG. 5c. An image-processing process according to the prior art typically removes all incidences of ridge discontinuities—typically indicative of dryness—and ridge interconnects—typically indicative of excess moisture. Unfortunately, at least some of said removed features typically are real features of the fingerprint, for instance the normal fingerprint shown in FIG. 5b includes incidences of ridge discontinuities and ridge interconnects. As such, the prior art method when applied to fingerprint image templates results in stored templates containing only a minimum set of features for comparison to a fingerprint presented for authentication thereof. It is a limitation of the prior art methods that user authentication is based on a sub-set of fingerprint—features such as minutiae, and as such the level of security, reliability, and ease of use provided by a system employing the prior art methods is less than optimal. Of course, acquisition parameter has been described in the form of a moisture content of a fingertip in the above example. More broadly, however, the term acquisition parameter relates to a global parameter relating to a condition of a biometric sample during sensing thereof. These include a sore throat for voice recognition systems, presence of a contact lens for retinal scan systems, and so forth. They also include, in some embodiments, portions of an image well captured. For example, too much pressure may be exerted on the right side of a palm print and too little pressure on the left side. Examples of acquisition parameters are pressure, moisture, dirt, damage, and so forth Referring to FIG. 6, shown is a simplified block diagram of a fingerprint identification/verification system 50 according to the instant invention. A fingerprint scanner 53 comprises a sensing area 52 for receiving a fingertip 51 of a user wishing to be authenticated. The fingerprint scanner 53 is one of an electronic fingerprint scanner, such as for instance the capacitive sensing array described with reference to FIGS. 1 and 2, and an optical fingerprint scanner employing a prism. Optionally, other types of fingerprint scanners that are well known in the art are employed. In operation, the fingerprint scanner 53 is in electrical communication with a processor 54 having software code in execution thereon for processing data indicative of a sensed fingerprint. The processor 54 is in electrical communication with a memory storage device 55. In a preferred embodiment the memory storage device 55 includes a first memory area 55a and a second memory area 55b, for instance the first memory area 55a comprises non-volatile memory and the second memory area 55b comprises volatile memory. The non-volatile memory 55a is for storing template images and/or image-processing processes that are for execution on processor 54. Optionally, the fingerprint scanner 53 is in electrical communication with the second addressable area 55b of the memory storage device 55. Further optionally, the system 50 includes an output display device (not shown) in communication with the processor 54 for providing prompts, signals and/or authentication results to at least one of a user and an administrator of the system 50.

Figure 7A:
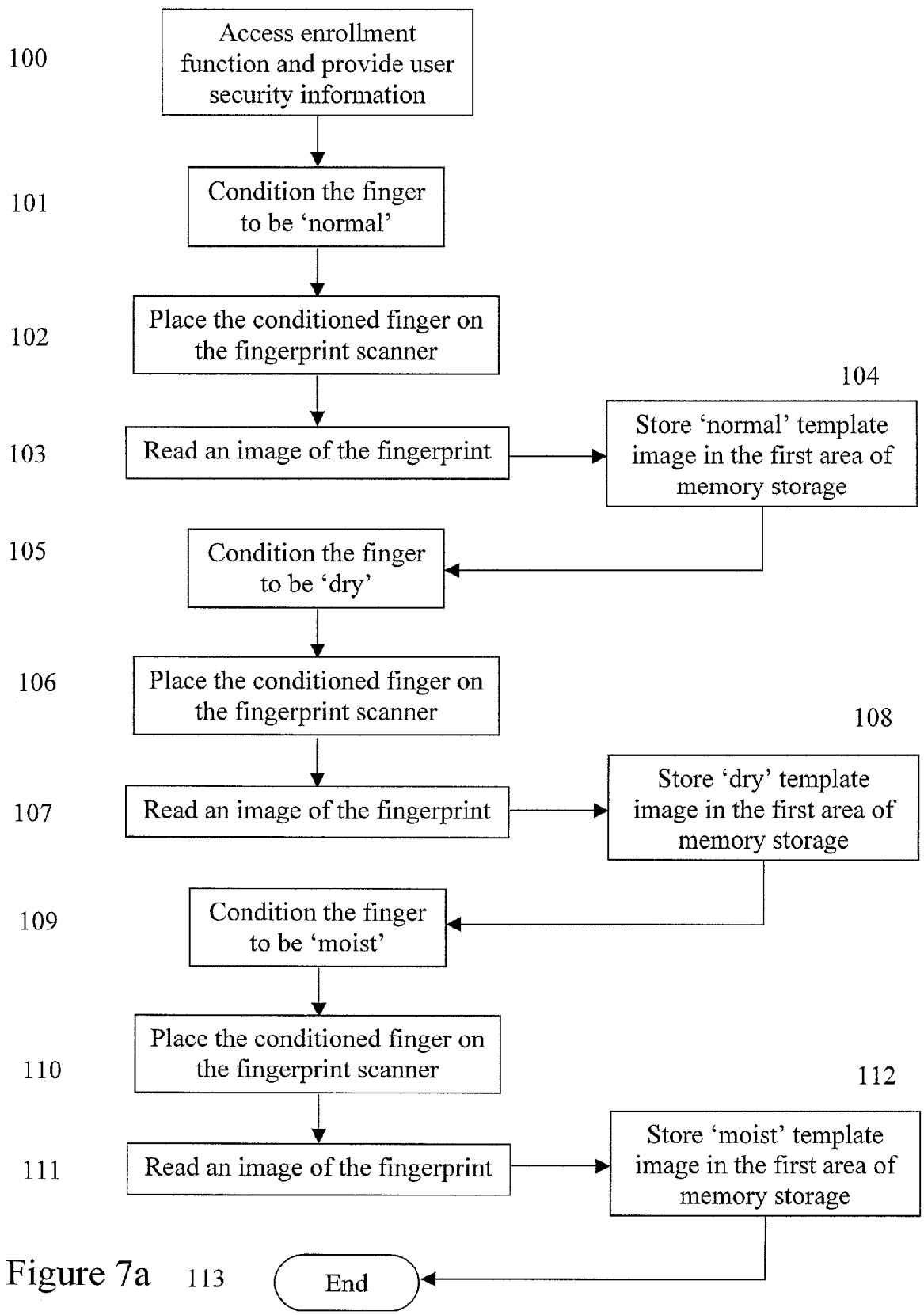
FIG. 7a is a simplified flow diagram of an enrollment operation for use with the fingerprint identification/verification system according to a first preferred embodiment of the instant invention.

Prior to using the system 50 for authentication purposes, each user enrolls with the system according to a predetermined enrollment process. Referring to FIG. 7a, shown is a simplified flow diagram of an enrollment process for use with a first preferred embodiment of the instant invention. The user accesses an enrollment function of the system at step 100, for instance the user provides a user name and password to log on to a computer system (not shown) in communication with the processor 54. In a preferred embodiment there is provided biographic information and security information to be stored in an enrollment file. Optionally, the provided information is entered by one of the user, a system administrator supervising and/or monitoring the user enrollment process, and a secure token containing previously authenticated enrollment information.

At step 101 the user conditions a fingertip to be, for example, in a 'normal' moisture level condition. Optionally, the fingertip is assumed to be in a 'normal' moisture level condition and step 101 is not performed. Of course, a 'normal' moisture level condition is considered to be a range of fingertip conditions that is approximately central to conditions of extreme dryness and of extreme moistness. In a preferred embodiment of the instant invention, a carrier (not shown) of a skin-conditioning agent such as one of a porous pad and a roller is contacted by the fingertip 51 to moisten the fingertip. A blotter (not shown) is provided to remove excess skin-conditioning agent from the fingertip 51 placed in contact therewith, leaving the fingertip in a condition within the 'normal' moisture level range. The fingertip 51 that is conditioned is one of a predetermined fingertip, such as a right thumb, a user selected fingertip or a fingertip selected by the system. Optionally, a plurality of different fingertips is conditioned.

The user at step 102 places the conditioned finger onto the sensing area 52 of the fingerprint scanner 53. At step 103 the image of the conditioned finger is captured, and at step 104 the captured image is stored in the first memory area 55a. Optionally, the processor 54 performs post-capture image processing or editing prior to storing the captured image in the first memory area 55a.

At step 105 the fingertip 51 is conditioned to be for example, in a 'dry' moisture level condition. Of course, a 'dry' moisture level condition is considered to be a range of fingertip conditions wherein the fingertip carries substantially less moisture than is 'normal'. In a preferred embodiment of the instant invention, one of a warm air blower (not shown), a blotter (not shown) and a carrier of a desiccating agent (not shown) is provided to excess remove moisture from the fingertip 51, leaving the fingertip in a 'dry' condition. The user at step 106 places the conditioned finger onto the sensing area 52 of the fingerprint scanner 53. At step 107 the image of the conditioned finger is captured, and at step 108 the captured image is stored in the first memory area 55a. Optionally, the processor 54 performs post-capture image processing or editing, for instance removes ridge discontinuities, prior to storing the captured image in the first memory area 55a.

At step 109 the fingertip 51 is conditioned to be for example, in a 'moist' moisture level condition. Of course, a 'moist' moisture level condition is considered to be a range of fingertip conditions wherein the fingertip carries substantially more moisture than is 'normal'. In a preferred embodiment of the instant invention, a carrier (not shown) of a skin-conditioning agent such as one of a porous pad and a roller is contacted by the fingertip 51 to moisten the fingertip. The user at step 110 places the conditioned finger onto the sensing area 52 of the fingerprint scanner 53. At step 111 the image of the conditioned finger is captured, and at step 112 the captured image is stored in the first memory area 55a. Optionally, the processor 54 performs post-capture image processing or editing, for instance ridge interconnects, prior to storing the captured image in the first memory area 55a.

The enrollment process of FIG. 7a terminates at step 113.

Figure 7B:
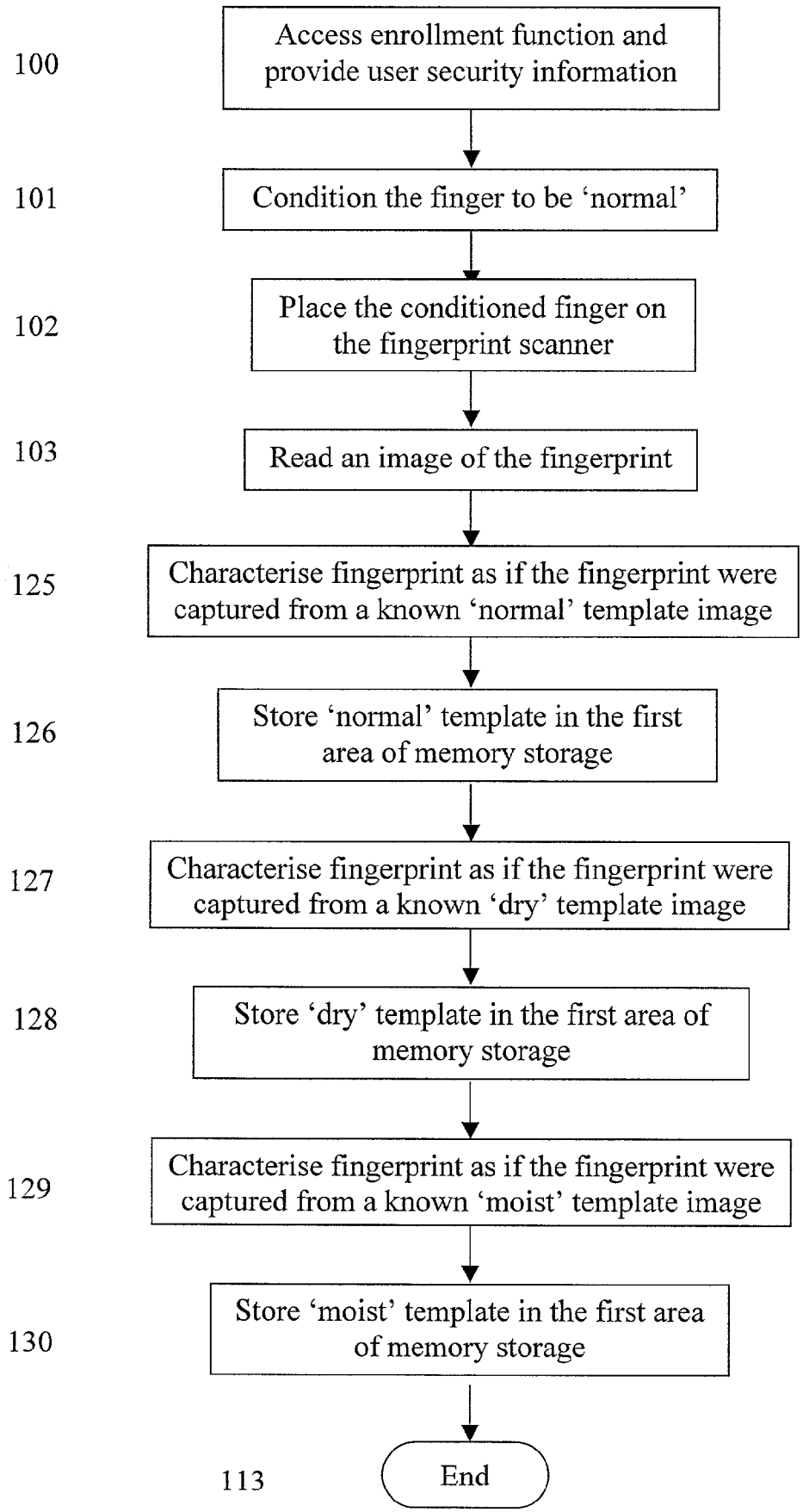
FIG. 7b is a simplified flow diagram of an enrollment operation for use with the fingerprint identification/verification system according to a second preferred embodiment of the instant invention.

Referring to FIG. 7b, another embodiment of the invention is shown in flow diagram. The user accesses an enrollment function of the system at step 100, for instance the user provides a user name and password to log on to a computer system (not shown) in communication with the processor 54. In a preferred embodiment there is provided biographic information and security level information to be stored in an enrollment file. Optionally, the provided information is entered by one of the user, a system administrator supervising and/or monitoring the user enrollment process, and a secure token containing previously authenticated enrollment information.

At step 101 the user conditions a fingertip to be in a 'normal' moisture level condition. Optionally, the fingertip is assumed to be in a 'normal' moisture level condition and step 101 is not performed. The user at step 102 places the conditioned finger onto the sensing area 52 of the fingerprint scanner 53. At step 103 the image of the conditioned finger is captured. Here, a single normal fingertip is imaged wherein normal denotes a level of moisture content approximately midway between extremes of dry and moist. The image captured is characterized at step 125 to extract therefrom a fingerprint template for use in user identification. The 'normal' template is stored at step 126 in association with a normal moisture level. This is similar to prior art template generation processes though here it is important that the user's fingertip be at a known normal moisture level.

The same fingerprint image is then characterized again at step 127 as if it were dry. This results in the removal of any features within the image that are possibly caused by dryness of the fingertip such as ridges that have breaks therein. The resulting template is based on a subset of features within the image and, as such, differs from the normal template. The features that are removed in the characterization process will be removed during fingerprint clean-up performed later should a fingertip be deemed dry during processing of an image thereof. Therefore, these features are necessarily removed. The 'dry' template is stored at step 128 in association with a dry moisture level.

Similarly, the same fingerprint image is then characterized again at step 129 as if it were moist. This results in the removal of any features within the image that are possibly caused by moisture of the fingertip such as ridges that have connections therebetween. The resulting 'moist' template is based on a subset of features within the image and, as such, differs from the 'normal' template. The features that are removed in the characterization process will be removed during fingerprint clean-up performed later should a fingertip be deemed moist during processing of an image thereof. Therefore, these features are necessarily removed. The 'moist' template is stored at step 130 in association with a moist moisture level.

As such, three templates result from a single image each based on a different state of an imaged fingertip. One of skill in the art will appreciate that in the 'moist' fingerprint template, features indicative of dryness and not of moistness remain. Similarly in the 'dry' fingerprint template, features indicative of moisture and not of dryness remain. Thus, a largest possible subset of reliable features remains for each template.

The enrollment process of FIG. 7b terminates at step 113.

Figure 7C:
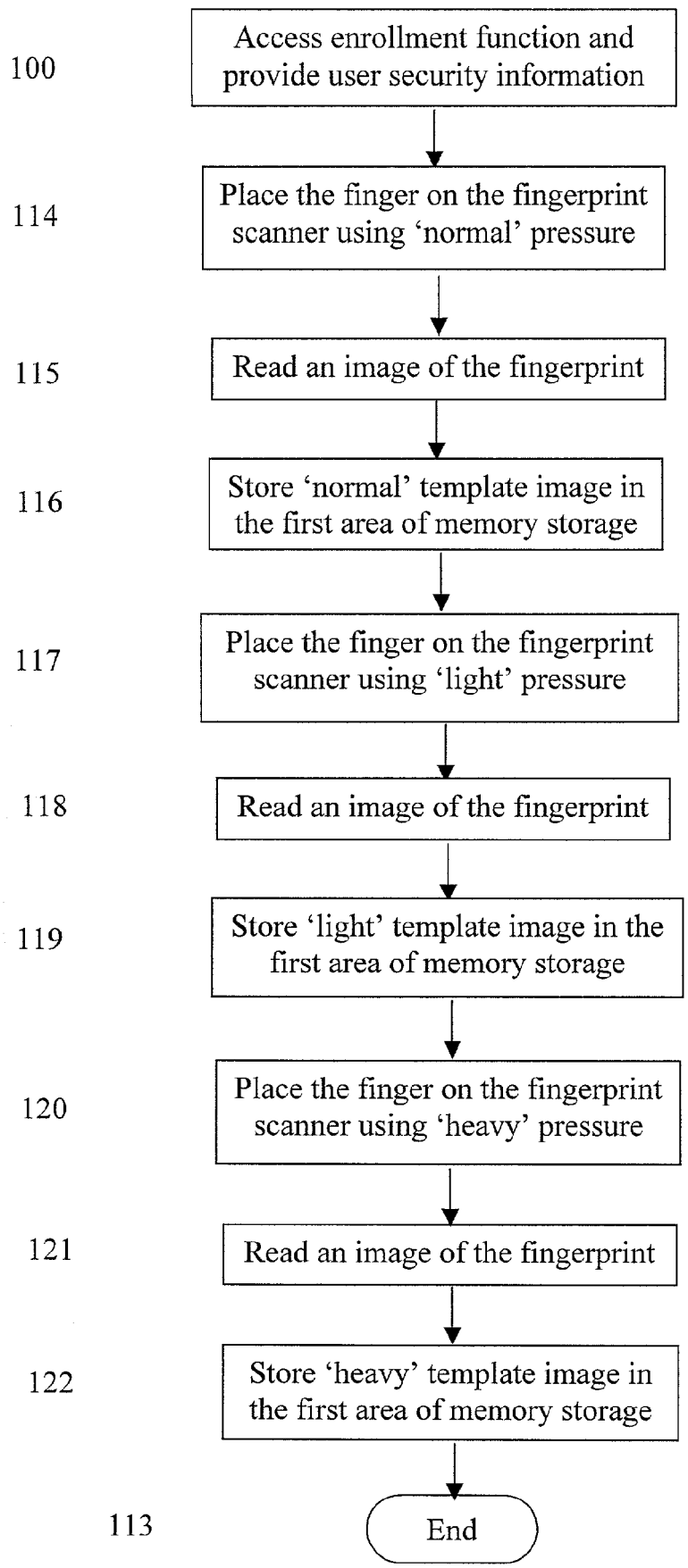
FIG. 7c is a simplified flow diagram of an enrollment operation for use with the fingerprint identification/verification system according to a third preferred embodiment of the instant invention.

Referring to FIG. 7c, shown is a simplified flow diagram of an enrollment process for use with a second preferred embodiment of the instant invention. The user accesses an enrollment function of the system at step 100, for instance the user provides a user name and password to log on to a computer system (not shown) in communication with the processor 54. In a preferred embodiment there is provided biographic information and security level information to be stored in an enrollment file. Optionally, the provided information is entered by one of the user, a system administrator supervising and/or monitoring the user enrollment process, and a secure token containing previously authenticated information.

The user at step 114 places a fingertip onto the sensing area 52 of the fingerprint scanner 53. In response to a prompt from the system 50, the user applies an indicated first amount of pressure to the sensing area 52 via fingertip 51, for instance a 'normal pressure'. In a preferred embodiment, the sensing area 52 includes a pressure sensor for providing a feedback signal to instruct the user to apply one of increased or decreased first amount of pressure. Optionally, the user determines subjectively the first amount of pressure that is 'normal'. At step 115 the 'normal pressure' image of the finger is captured, and at step 116 the captured 'normal pressure' image is stored in the first memory area 55a. Optionally, the processor 54 performs post-capture image processing or editing prior to storing the captured 'normal pressure' image in the first memory area 55a.

In response to another prompt from the system 50, the user at step 117 applies an indicated second amount of pressure to the sensing area 52 via fingertip 51, for instance a 'light pressure'. In a preferred embodiment, the sensing area 52 includes a pressure sensor for providing a feedback signal to instruct the user to apply one of increased or decreased second amount of pressure. Optionally, the user determines subjectively the second amount of pressure that is 'light'. At step 118 the 'light pressure' image of the finger is captured, and at step 119 the captured 'light pressure' image is stored in the first memory area 55a. Optionally, the processor 54 performs post-capture image processing or editing prior to storing the captured 'light pressure' image in the first memory area 55a.

In response to yet another prompt from the system 50, the user at step 120 applies an indicated third amount of pressure to the sensing area 52 via fingertip 51, for instance a 'heavy pressure'. In a preferred embodiment, the sensing area 52 includes a pressure sensor for providing a feedback signal to instruct the user to apply one of increased or decreased third amount of pressure. Optionally, the user determines subjectively the third amount of pressure that is 'heavy'. At step 121 the 'heavy pressure' image of the finger is captured, and at step 122 the captured 'heavy pressure' image is stored in the first memory area 55a. Optionally, the processor 54 performs post-capture image processing or editing prior to storing the captured 'heavy pressure' image in the first memory area 55a.

The enrollment process of FIG. 7c terminates at step 113.

Figure 7D:
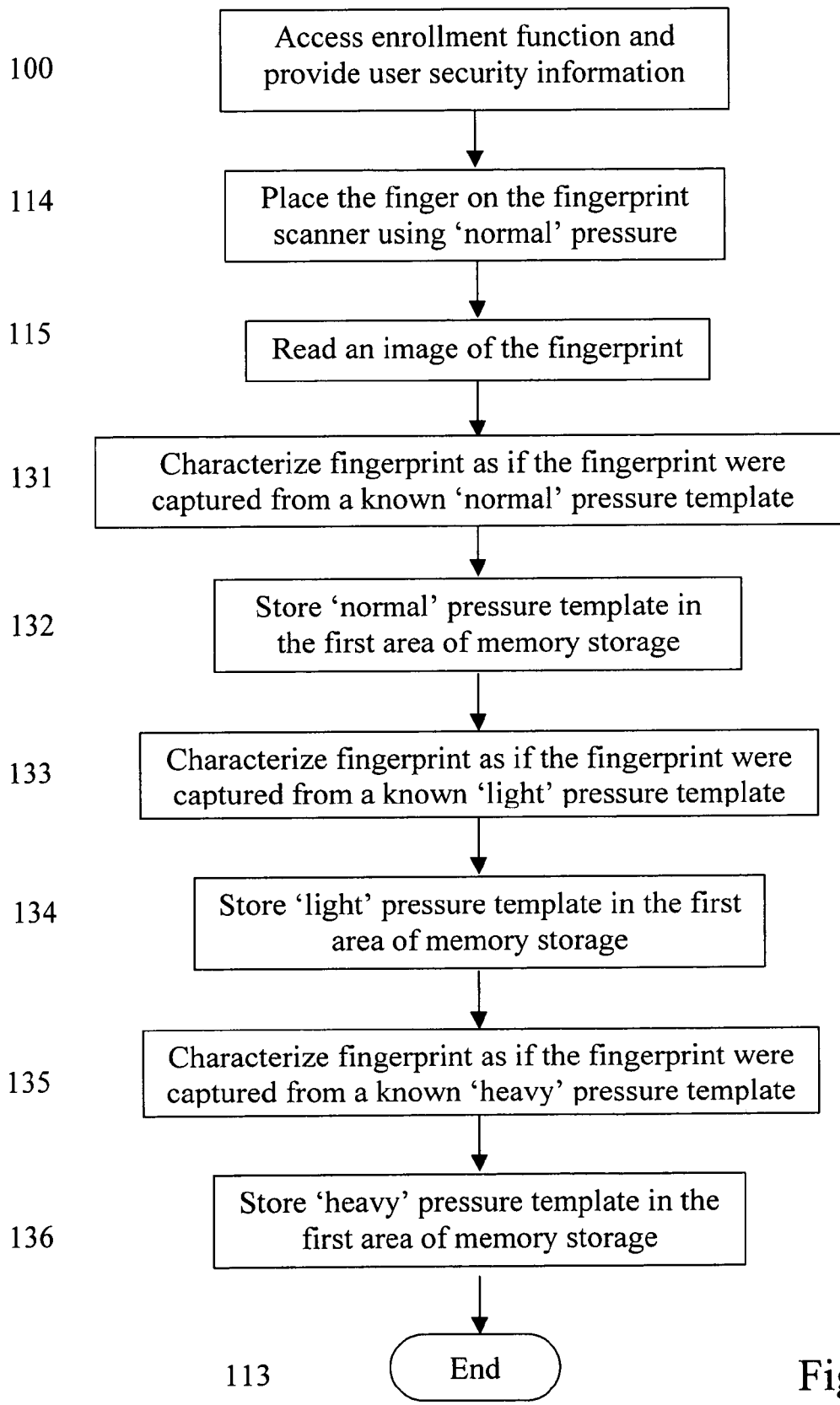
FIG. 7d is a simplified flow diagram of an enrollment operation for use with the fingerprint identification/verification system according to a fourth preferred embodiment of the instant invention.

Referring to FIG. 7d, another embodiment of the invention is shown in flow diagram. The user accesses an enrollment function of the system at step 100, for instance the user provides a user name and password to log on to a computer system (not shown) in communication with the processor 54. In a preferred embodiment there is provided biographic information and security level information to be stored in an enrollment file. Optionally, the provided information is entered by one of the user, a system administrator supervising and/or monitoring the user enrollment process, and a secure token containing previously authenticated enrollment information.

The user at step 114 places a fingertip onto the sensing area 52 of the fingerprint scanner 53. In response to a prompt from the system 50, the user applies an indicated first amount of pressure to the sensing area 52 via fingertip 51, for instance a 'normal pressure'. In a preferred embodiment, the sensing area 52 includes a pressure sensor for providing a feedback signal to instruct the user to apply one of increased or decreased first amount of pressure. Optionally, the user determines subjectively the first amount of pressure that is 'normal'. At step 115 an image of the finger is captured. The image captured is characterized at step 131 to extract therefrom a fingerprint template for use in user identification. The 'normal' pressure template is stored at step 132 in association with a 'normal' applied pressure level. This is similar to prior art template generation processes though here it is important that the user's fingertip be at a known 'normal' applied pressure level.

The same fingerprint image is then characterized again at step 133 as if it were obtained when the user applied inadequate or 'light' pressure. This results in the removal of any features within the image that are possibly caused by a failure of the user to press the fingertip firmly against the sensing area 52 of the scanner 53, such as for instance ridges that have breaks therein. The resulting template is based on a subset of features within the image and, as such, differs from the 'normal' pressure template. The features that are removed in the characterization process will be removed during fingerprint clean-up performed later should a fingertip pressure be deemed 'light' during processing of an image thereof. Therefore, these features are necessarily removed. The 'light' pressure template is stored at step 134 in association with a 'light' applied pressure level.

Similarly, the same fingerprint image is then characterized again at step 135 as if it were obtained when the user applied excessive or 'heavy' pressure. This results in the removal of any features within the image that are possibly caused by the user pressing the fingertip excessively hard against the sensing area 52 of the scanner 53, such as for instance ridges that have connections therebetween. The resulting template is based on a subset of features within the image and, as such, differs from the 'normal' pressure template. The features that are removed in the characterization process will be removed during fingerprint clean-up performed later should a fingertip pressure be deemed 'heavy' during processing of an image thereof. Therefore, these features are necessarily removed. The 'heavy' pressure template is stored at step 134 in association with a 'heavy' applied pressure level.

As such, three templates result from a single image each based on a different applied pressure of an imaged fingertip. One of skill in the art will appreciate that in the 'heavy' fingerprint template, features indicative of excessive applied pressure and not of insufficient applied pressure remain. Similarly in the 'light' fingertip template, features indicative of insufficient applied pressure and not of excessive applied pressure remain. Thus, a largest possible subset of reliable features remains for each template.

The enrollment process of FIG. 7d terminates at step 113.

Optionally, the user enrolls according to at least two of the methods described with reference to FIGS. 7a-7d, for instance the user enrollment file includes a plurality of template images obtained for a range of fingertip moisture levels and a plurality of template images obtained for a range of fingertip pressures. Further optionally, each plurality of template images includes more than three template images. For instance, a plurality of template images includes images obtained for very dry, dry, normal, moist and very moist levels of the fingertip 51. Still further optionally, the enrollment process of at least one of FIGS. 7a, 7b 7c and 7d is repeated using at least a second different fingertip of the user.

In an alternate embodiment, the user provides a single template image during the enrollment process and subsequently, for instance during use, the system 50 'learns' gradually to identify images of 'moist' and 'dry' fingerprints. In one embodiment, the template image is updated at predetermined intervals using, for example, a last fingerprint image provided by the user and resulting in authentication thereof. Of course, the fingerprint image is processed to remove ridge discontinuities and/or ridge interconnects, which often are transient features of a fingerprint and vary in dependence upon the level of moisture carried upon the fingertip being imaged. Some ridge discontinuities and/or ridge interconnects, after being detected consistently over a predetermined period of time, may in fact represent actual permanent or semi-permanent features of the fingerprint and as such can be added to the template image the next time it is updated or, preferably, over time in a gradual fashion.

Figure 8:
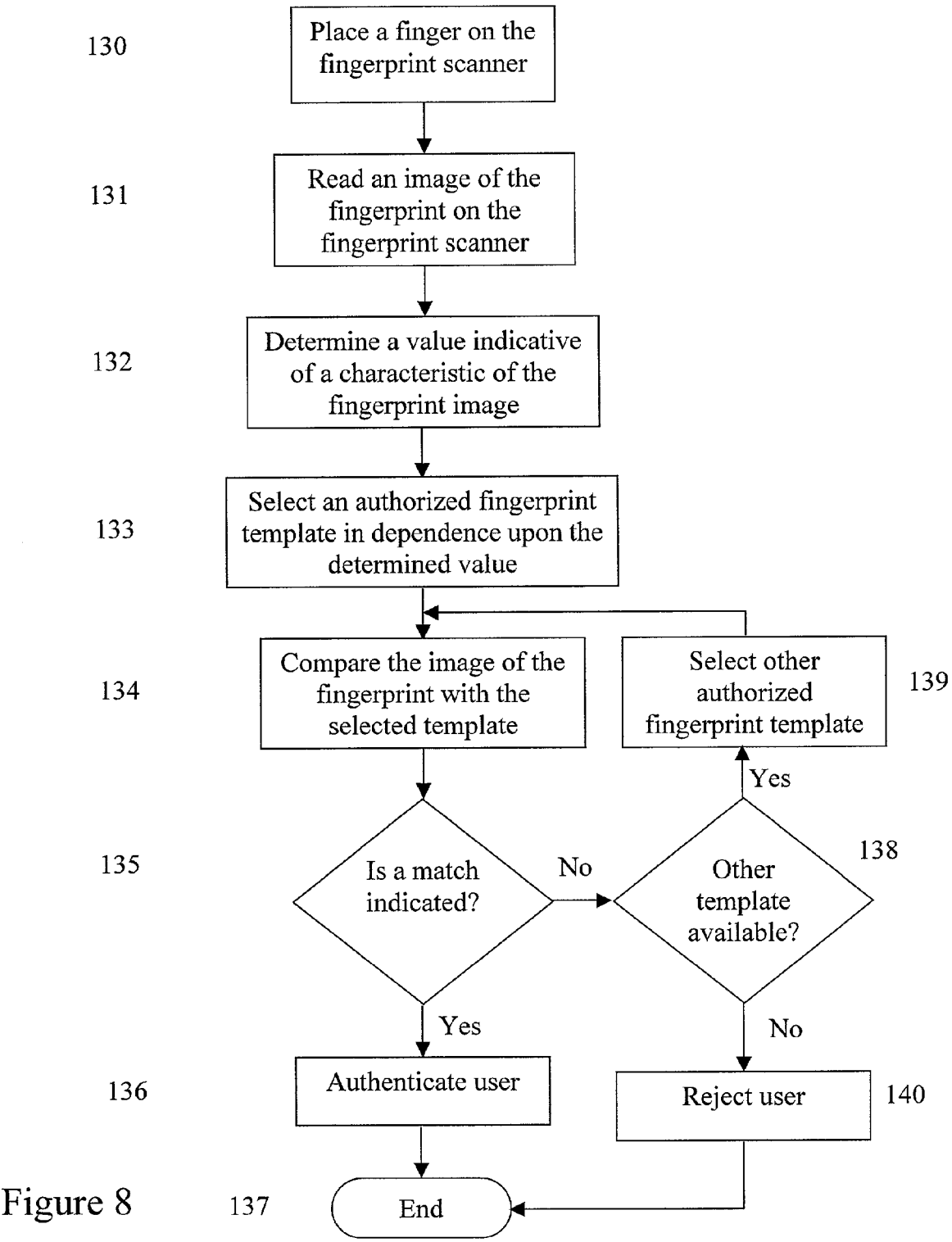
FIG. 8 is a simplified flow diagram of an authentication process for use with the fingerprint identification/verification system according to an embodiment of the instant invention.

Referring to FIG. 8, shown is a method for authenticating a user, the user having enrolled previously as described supra. In use, the user wishing to be authenticated, for instance to gain access to one of a secure location and a secure data file, places at step 130 a predetermined fingertip 51 onto the sensing area 52 of the fingerprint scanner 53. Optionally, for instance if the user provided a plurality of different fingertips during the enrollment process, the user selects a fingertip at random or selects a fingertip in response to a prompt by the system 50. At step 131 the ridge-and-valley pattern of the fingertip 51 is sensed electronically by the sensing area 52 and an image of the fingerprint is captured by the fingerprint scanner 53. The fingerprint image is provided to the processor 54, processed by the processor 54 to clean up the image, and stored in the second area 55b. Optionally, the fingerprint image is stored directly as captured by the fingerprint scanner 53 and is retrieved by the processor 54.

At step 132 the fingerprint image is processed using code in execution on the processor 54 to determine a value indicative of a characteristic, such as for instance a moisture level condition, of the fingerprint. For example, image processing is employed to quantify the incidences of fingerprint ridge discontinuities and interconnects, and to compare a result of said quantification with a database of expected values for different fingerprint moisture levels. The determined value indicative of a moisture level of the fingerprint is a relative score, wherein 'dry' or 'very dry' are at one extreme and 'moist' or 'very moist' are at the other extreme. In dependence upon the determined value indicative of a moisture level of the fingerprint, the processor 54 selects at step 133 an authorized fingerprint template image obtained under similar moisture level conditions and retrieves same from the first memory area 55a.

At step 134 the processor 54 compares the fingerprint image with the selected authorized fingerprint template image. For instance, the processor extracts features or minutiae of the image for comparison with similar extracted features or minutiae of the selected authorized fingerprint template image according to processes that are well known to those of skill in the art. If at decision step 135 the result of the comparison indicates a match between the fingerprint image and the selected authorized fingerprint template image, the user at step 136 is authenticated by the system 51 and the method of FIG. 8 terminates at step 137. If at decision step 135 the result of the comparison indicates other than a match between the fingerprint image and the selected authorized fingerprint template image, the availability of other similar template images is determined at optional step 138. If other similar template images are available, a second authorized fingerprint template image is selected at optional step 139, and steps 134 and 135 are repeated. If it is determined at optional step 138 that other similar template images are other than available, the user is rejected at step 140 and the method of FIG. 8 terminates at step 137.

Optionally, at step 134 a predetermined process is used to 'clean-up' the fingerprint image, for instance all ridge discontinuities and ridge interconnects are digitally removed, smoothed and/or otherwise processed to produce a processed fingerprint image. The processed fingerprint image is compared to a similarly processed template image, which template image was stored in association with a same moisture level condition of the original fingerprint image.

Figure 9:
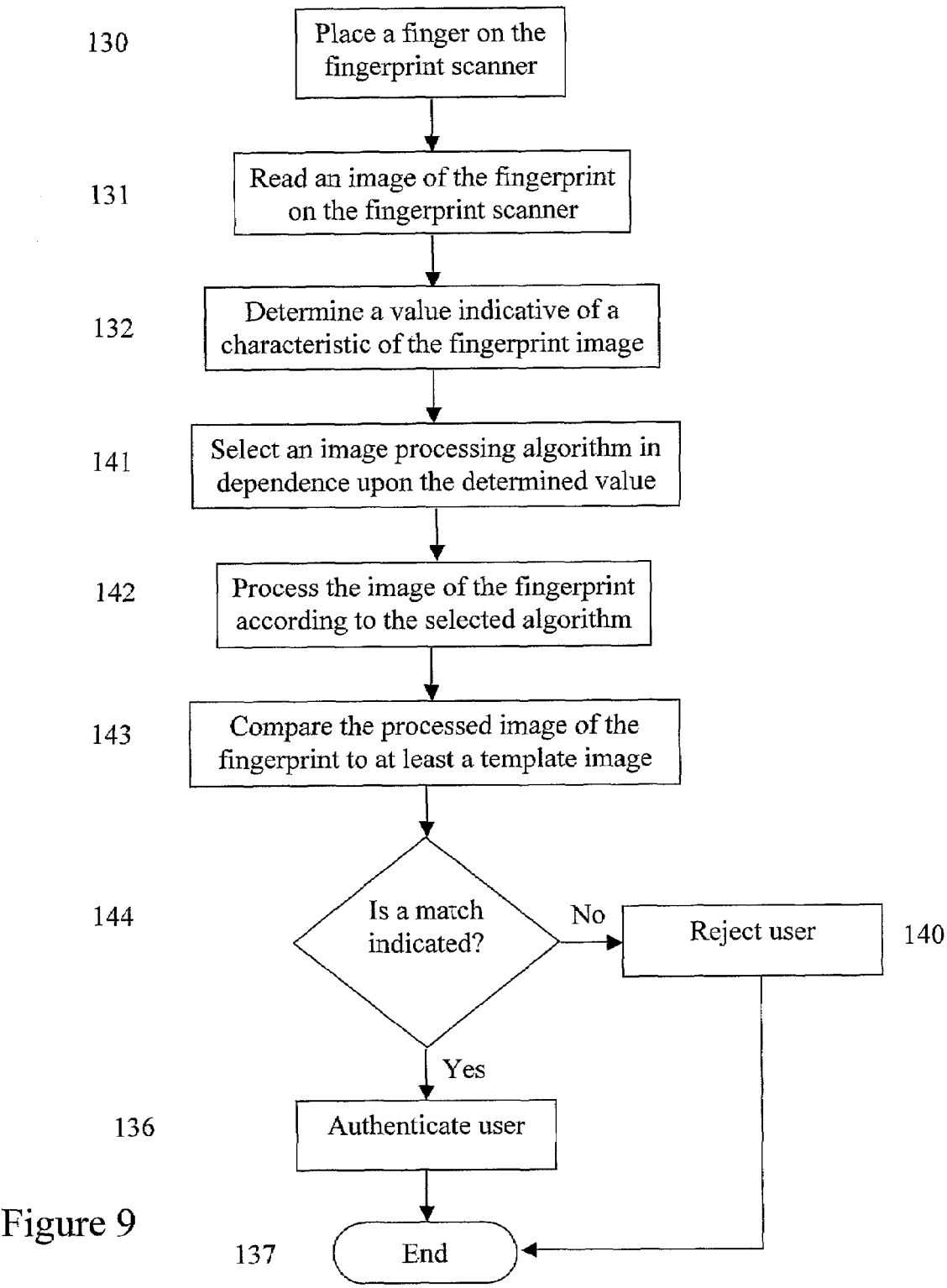
FIG. 9 is a simplified flow diagram of another authentication process for use with the fingerprint identification/verification system according to an embodiment of the instant invention.

Referring to FIG. 9, shown is another method for authenticating a user, the user having enrolled previously as described supra. In use, the user wishing to be authenticated, for instance to gain access to one of a secure location and a secure data file, places at step 130 a predetermined fingertip 51 onto the sensing area 52 of the fingerprint scanner 53. Optionally, for instance if the user provided a plurality of different fingertips during the enrollment process, the user selects a fingertip at random or selects a fingertip in response to a prompt by the system 50. At step 131 the ridge-and-valley pattern of the fingertip 51 is sensed electronically by the sensing area 52 and an image of the fingerprint is captured by the fingerprint scanner 53. The fingerprint image is provided to the processor 54, processed by the processor 54 to clean-up the image, and stored in the second area 55b. Optionally, the fingerprint image is stored directly as captured by the fingerprint scanner 53 and is retrieved by the processor 54.

At step 132 the fingerprint image is processed using code in execution on the processor 54 to determine a value indicative of a characteristic, such as for example a moisture level, of the fingerprint. For instance, image processing is performed to quantify the incidences of fingerprint ridge discontinuities and interconnects, and to compare a result of said quantification with a database of expected values for different fingerprint moisture levels. The determined value indicative of a moisture level of the fingerprint is a relative score, wherein 'dry' or 'very dry' are at one extreme and 'moist' or 'very moist' are at the other extreme. In dependence upon the determined value indicative of the characteristic of the fingerprint, the processor 54 selects at step 141 a process for processing the fingerprint. If the characteristic of the fingerprint is indicative of the fingertip being dry, then a selected process removes at step 142 all of the ridge discontinuities in the image. Similarly, if the characteristic of the fingerprint is indicative of the fingertip being moist, then a second different selected process removes at step 142 all of the ridge interconnections. Of course, if the characteristic of the fingerprint is indicative of the fingertip being normal, then a third different selected process at step 142 performs only a general clean-up of the captured image.

At step 143 the processed fingerprint image is compared to at least a template image to perform one of an identification operation and a verification operation, such as to authenticate the user. If at decision step 144 a match is indicated, the user is authenticated at step 136. Of course, if other than a match is indicated at decision step 144, the user is rejected at step 136.

The method of FIG. 9 terminates at step 137.

Advantageously, only the ridge discontinuities are removed from a 'dry' fingerprint image, such that the image so processed retains actual ridge interconnect features, which features are useful for confirming the identity of the user. Similarly, only the ridge interconnects are removed from a 'moist' fingerprint image, such that the image so processed retains actual ridge discontinuity features, which features are also useful for confirming the identity of the user. As such, selecting the image-processing process in dependence upon the determined characteristic of the fingerprint provides a larger set of extractable features for use with the authentication method according to FIG. 9.

Figure 10:
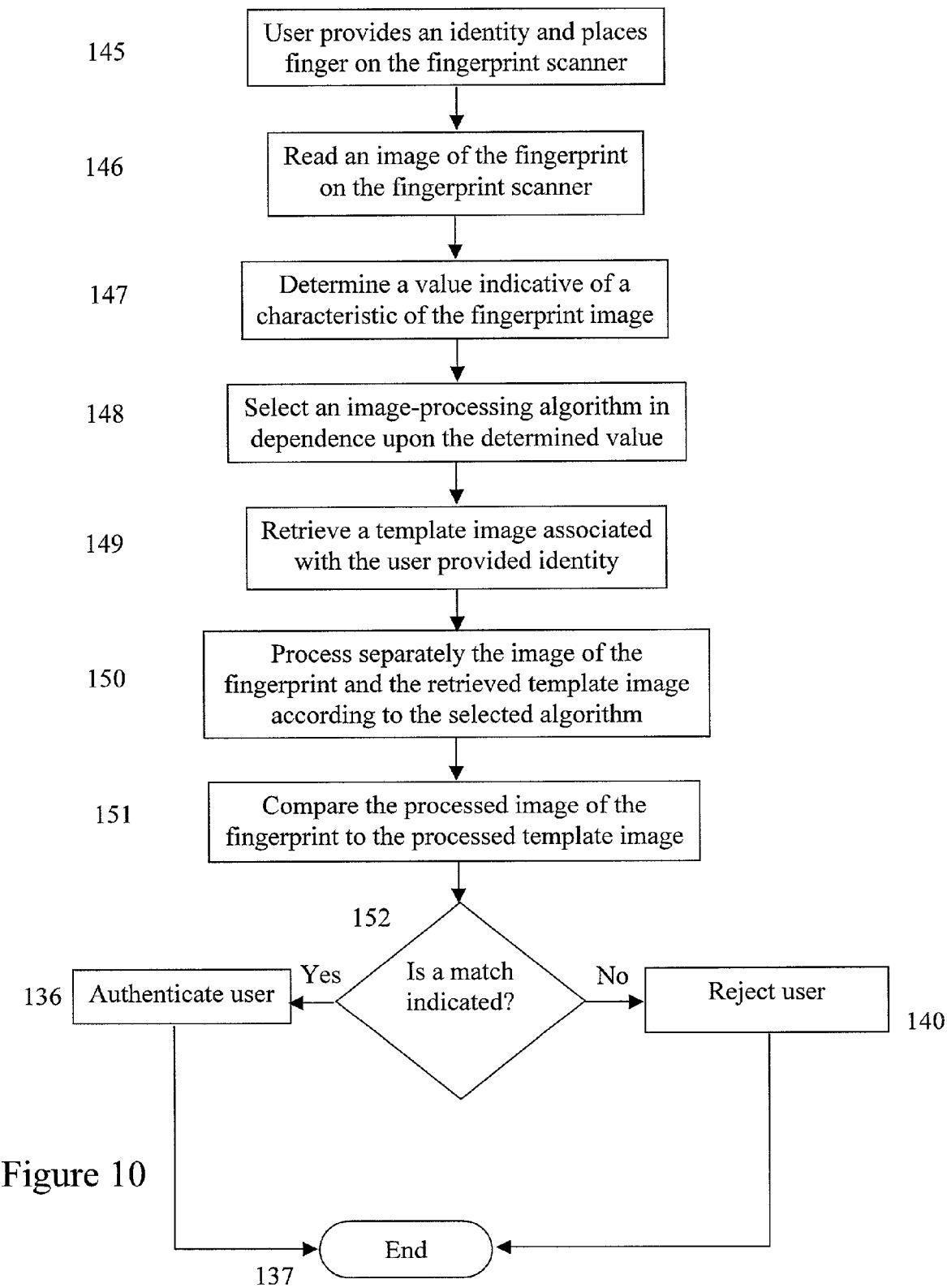
FIG. 10 is a simplified flow diagram of yet another authentication process for use with the fingerprint identification/verification system according to an embodiment of the instant invention.

Referring to FIG. 10, shown is another method for authenticating a user, the user having been enrolled previously as described supra. The method according to FIG. 10 is intended for with a system to perform a one-to-one identification of a user. The user at step 145 provides their identity and places a predetermined fingertip 51 onto the sensing area 52 of the fingerprint scanner 53. Optionally, for instance if the user provided a plurality of different fingertips during the enrollment process, the user selects a fingertip at random or selects a fingertip in response to a prompt by the system 50. At step 146 the ridge-and-valley pattern of the fingertip 51 is sensed electronically by the sensing area 52 and an image of the fingerprint is captured by the fingerprint scanner 53. The fingerprint image is provided to the processor 54, processed by the processor 54 to clean-up the image, and stored in the second area 55b. Optionally, the fingerprint image is stored directly as captured by the fingerprint scanner 53 and is retrieved by the processor 54.

At step 147 the fingerprint image is processed using code in execution on the processor 54 to determine a value indicative of a characteristic, such as for example a moisture level, of the fingerprint. For instance, image processing is performed to quantify the incidences of fingerprint ridge discontinuities and interconnects, and to compare a result of said quantification with a database of expected values for different fingerprint moisture levels. The determined value indicative of a moisture level of the fingerprint is a relative score, wherein 'dry' or 'very dry' are at one extreme and 'moist' or 'very moist' are at the other extreme. In dependence upon the determined value indicative of the characteristic of the fingerprint, the processor 54 selects at step 148 a process for processing the fingerprint.

At step 149 a fingerprint template associated with the identity provided by the user at step 145 is retrieved from memory storage. At step 150 the fingerprint image and the retrieved template image are processed separately according to the process selected at step 148. If the characteristic of the fingerprint determined at step 147 is indicative of the fingertip being dry, then a selected process removes at step 150 all of the ridge discontinuities in the image. Similarly, if the characteristic of the fingerprint determined at step 147 is indicative of the fingertip being moist, then a second different selected process removes at step 150 all of the ridge interconnections. Of course, if the characteristic of the fingerprint determined at step 147 is indicative of the fingertip being normal, then a third different selected process at step 150 performs only a general cleanup of the captured image.

Preferably, each process includes code for filtering the template image to determine features that are unique to the user that provided said template image. Such features include: ridge discontinuities, ridge interconnects, scars, wrinkles etc. Advantageously, permanent features identified in the template and located within the fingerprint image during processing thereof are other than removed from the fingerprint image. This is particularly significant when the permanent features appear otherwise to be a moisture-dependent transient feature of the fingerprint.

At step 151 the processed fingerprint image is compared to the processed template image to perform one of an identification operation and a verification operation, such as to authenticate the user. If at decision step 152 a match is indicated, the user is authenticated at step 136. Of course, if other than a match is indicated at decision step 152, the user is rejected at step 136.

The method of FIG. 10 terminates at step 137.

Of course, the fingerprint scanner 53 for scanning template images during the enrollment process of FIGS. 7a-7d is located optionally in a secure location to control access thereto. Other fingerprint scanners, which are located at remote locations and/or are integrally formed into electronic devices, walls, doors or furniture, are provided for identifying and/or verifying users requesting authentication at said remote locations. Optionally, the other fingerprint scanners are lower resolution, and thus relatively inexpensive, compared to the centrally located enrollment scanner. Of course, each of the other fingerprint scanners is in electrical communication with the processor 54. Optionally, each of the other fingerprint scanners comprises a separate processor, each separate processor in electrical communication with the memory storage device 55, which is within a central, secure location.

Numerous other embodiments may be envisaged without departing from the spirit and scope of the invention.

What is claimed is:

1. A method for fingerprint authentication comprising:
a) acquiring an image of a fingertip of an individual;
b) processing the image to determine a value indicative of a physical parameter of the fingertip, wherein the physical parameter is a moisture condition of the fingertip and/or an applied pressure of the fingertip;
c) comparing the image to a stored biometric template, the comparison process being selected based on the determined value, the comparison process involving different image processing steps for different determined values; and
d) performing one of an authentication and a rejection in dependence upon the comparison.

2. A method for fingerprint authentication according to claim 1 wherein the determined value is quantitatively indicative of the physical parameter.

3. A method for fingerprint authentication according to claim 1 wherein the comparison process uses a biometric template selected in dependence upon the determined value, different biometric templates selected for different determined values.

4. A method for fingerprint authentication according to claim 3 wherein the comparison process includes:
c1) selecting an image-processing process in dependence upon the determined value;

c2) according to the selected image-processing process, processing the image to remove a subset of features contained therein; and, c3) comparing the processed image to the selected biometric template, wherein the biometric template is processed according to a same selected image-processing process prior to being selected for comparison.

5. A method for fingerprint authentication according to claim 3 wherein the comparison process includes:

c1) selecting an image-processing process in dependence upon the determined value;

c2) according to the selected image-processing process, processing the image to remove a subset of features contained therein;

c3) according to the selected image-processing process, processing the selected biometric template to remove a subset of features contained therein; and, c4) comparing the processed image to the processed selected biometric template.

6. A method for fingerprint authentication according to claim 3 wherein the biometric template is selected from a plurality of biometric templates, each biometric template of the plurality of biometric templates stored in association with a moisture condition of the fingertip.

7. A method for fingerprint authentication according to claim 3 wherein the biometric template is selected from a plurality of biometric templates, each biometric template of the plurality of biometric templates stored in association with an applied pressure of the fingertip.

8. A method for fingerprint authentication comprising:

a) acquiring an image of a fingertip of an individual;

b) processing the image to determine a value indicative of a physical parameter of the fingertip, the physical parameter affecting the acquired image and independent of the identity of the individual;

c) processing the acquired image according to a predetermined image-processing process to remove a subset of features from the acquired image, the predetermined image-processing process involving different image processing steps for different determined values;

d) selecting a biometric template in dependence upon the determined value, the biometric template processed according to the predetermined image-processing process;

e) comparing the processed acquired image to the biometric template; and, f) performing one of an authentication and a rejection in dependence upon the comparison.

9. A method for fingerprint authentication according to claim 8 including prior to a):

providing a plurality of biometric template images of a same fingertip, each biometric template image associated with a different predetermined physical parameter of a specific fingertip, the physical parameter affecting the acquired image and independent of the identity of the individual, wherein each biometric template image is processed according to the predetermined image processing process.

10. A method for fingerprint authentication according to claim 9 wherein the determined physical parameter is a moisture condition of the fingertip.

11. A method for fingerprint authentication according to claim 10 wherein providing a plurality of biometric template images of a same fingertip includes repeating for each predetermined moisture condition:

conditioning the fingertip to be in the predetermined moisture condition;

placing the conditioned fingertip onto a sensing surface; and, capturing an image of the conditioned fingertip.

12. A method for fingerprint authentication according to claim 9 wherein the determined physical parameter is an applied pressure of the fingertip.

13. A method for fingerprint authentication according to claim 12 wherein providing a plurality of biometric template images of a same fingertip includes repeating for each predetermined applied pressure:

placing the fingertip onto a sensing surface using the predetermined applied pressure; and, capturing an image of the fingertip.

14. A system for fingerprint authentication comprising:

a sensing area for capturing an image of a fingertip of an individual presented thereto;

a memory storage area for storing captured images therein; and a processor for executing code thereon to process the captured image to determine a value indicative of a physical parameter, wherein the physical parameter is a moisture condition of the fingertip and/or an applied pressure of the fingertip and to compare the captured image to a template image according to an image-processing process selected in dependence upon the determined value, the image-processing process involving different image processing steps for different determined values.

15. A system as in claim 14 wherein the determined value is quantitatively indicative of the physical parameter.

16. A system as in claim 14 wherein the processor compares the captured image to the template image using a biometric template selected in dependence upon the determined value, different biometric templates selected for different determined values.

17. A system as in claim 16 wherein the processor compares the captured image to the template image by performing the steps of:

selecting an image-processing process in dependence upon the determined value;

according to the selected image-processing process, processing the image to remove a subset of features contained therein; and comparing the processed image to the selected biometric template, wherein the biometric template is processed according to a same selected image-processing process prior to being selected for comparison.

18. A system as in claim 16 wherein the processor compares the captured image to the template image by performing the steps of:

selecting an image-processing process in dependence upon the determined value;

according to the selected image-processing process, processing the image to remove a subset of features contained therein;

according to the selected image-processing process, processing the selected biometric template to remove a subset of features contained therein; and comparing the processed image to the processed selected biometric template.

19. A system as in claim 16 wherein the biometric template is selected from a plurality of biometric templates, each biometric template of the plurality of biometric templates stored in association with a moisture condition of the fingertip.

20. A system as in claim 16 wherein the biometric template is selected from a plurality of biometric templates, each biometric template of the plurality of biometric templates stored in association with an applied pressure of the fingertip.

21. A system for fingerprint authentication comprising:
 a sensing area for capturing an image of a fingertip of an individual presented thereto;
 a memory storage area for storing captured images therein; and
 a processor for executing code thereon to process the captured image to determine a value indicative of a physical parameter of the fingertip, the physical parameter affecting the acquired image and independent of the identity of the individual, the acquired image further being processed according to a predetermined image-processing process to remove a subset of features from the acquired image, the predetermined image-processing process involving different image processing steps for different determined values, the processor further selecting a biometric template in dependence upon the determined value, the biometric template processed according to the predetermined image-processing process, and the processor comparing the processed acquired image to the biometric template to perform one of an authentication and a rejection in dependence upon the comparison.

22. A system as in claim 21 wherein said memory storage area includes a plurality of biometric template images of a same fingertip, each biometric template image associated with a different predetermined physical parameter of a specific fingertip, the physical parameter affecting the acquired image and independent of the identity of the individual, wherein each biometric template image is processed by the processor according to the predetermined image processing process.

23. A system as in claim 22 wherein the determined physical parameter is a moisture condition of the fingertip.

24. A system as in claim 22 wherein the determined physical parameter is an applied pressure of the fingertip.

25. A method for fingerprint authentication comprising:
 a) acquiring an image of a fingertip of an individual;
 b) processing the image to determine a value indicative of a physical parameter of the fingertip, wherein the physical parameter is a moisture condition of the fingertip and/or an applied pressure of the fingertip;
 c) comparing the image to a stored biometric template, the comparison process using a biometric template selected in dependence upon the determined value, different biometric templates selected for different determined values; and
 d) performing one of an authentication and a rejection in dependence upon the comparison.

26. A method as in claim 25 wherein the comparison process is selected based on the determined value, the comparison process involving different image processing steps for different determined values.

27. A method as in claim 26 wherein the determined value is quantitatively indicative of the physical parameter.

28. A method as in claim 25 wherein the comparison process includes:
 c1) selecting an image-processing process in dependence upon the determined value;
 c2) according to the selected image-processing process, processing the image to remove a subset of features contained therein; and,
 c3) comparing the processed image to the selected biometric template, wherein the biometric template is processed according to a same selected image-processing process prior to being selected for comparison.

29. A method as in claim 25 wherein the comparison process includes:
 c1) selecting an image-processing process in dependence upon the determined value;
 c2) according to the selected image-processing process, processing the image to remove a subset of features contained therein;
 c3) according to the selected image-processing process, processing the selected biometric template to remove a subset of features contained therein; and,
 c4) comparing the processed image to the processed selected biometric template.

30. A method as in claim 25 wherein the biometric template is selected from a plurality of biometric templates, each biometric template of the plurality of biometric templates stored in association with a moisture condition of the fingertip.

31. A method as in claim 25 wherein the biometric template is selected from a plurality of biometric templates, each biometric template of the plurality of biometric templates stored in association with an applied pressure of the fingertip.

32. A system for fingerprint authentication comprising:
 a sensing area for capturing an image of a fingertip of an individual presented thereto;
 a memory storage area for storing captured images therein; and
 a processor for executing code thereon to process the captured image to determine a value indicative of a physical parameter, wherein the physical parameter is a moisture condition of the fingertip and/or an applied pressure of the fingertip, and to compare the captured image to a biometric template selected in dependence upon the determined value, different biometric templates selected for different determined values.

33. A system as in claim 32 wherein the comparison process performed by the processor is selected based on the determined value, the comparison process involving different image processing steps for different determined values.

34. A system as in claim 33 wherein the determined value is quantitatively indicative of the physical parameter.

35. A system as in claim 32 wherein the processor compares the captured image to the template image by performing the steps of:
 selecting an image-processing process in dependence upon the determined value;
 according to the selected image-processing process, processing the image to remove a subset of features contained therein; and
 comparing the processed image to the selected biometric template, wherein the biometric template is processed according to a same selected image-processing process prior to being selected for comparison.

36. A system as in claim 32 wherein the processor compares the captured image to the template image by performing the steps of:
 selecting an image-processing process in dependence upon the determined value;
 according to the selected image-processing process, processing the image to remove a subset of features contained therein;
 according to the selected image-processing process, processing the selected biometric template to remove a subset of features contained therein; and comparing the processed image to the processed selected biometric template.

37. A system as in claim 32 wherein the biometric template is selected from a plurality of biometric templates, each biometric template of the plurality of biometric templates stored in association with a moisture condition of the fingertip.

38. A system as in claim 32 wherein the biometric template is selected from a plurality of biometric templates, each biometric template of the plurality of biometric templates stored in association with an applied pressure of the fingertip.

39. A computer readable medium having computer software for use in fingerprint authentication wherein an image of a fingertip of an individual is acquired, said software comprising:
   computer executable instructions for processing the image to determine a value indicative of a physical parameter of the fingertip, wherein the physical parameter is a moisture condition of the fingertip and/or an applied pressure of the fingertip;
   computer executable instructions for comparing the image to a stored biometric template, the comparison process being selected based on the determined value, the comparison process involving different image-processing steps for different determined values; and
   computer executable instructions for performing one of an authentication and a rejection in dependence upon the comparison.

40. Computer software for fingerprint authentication according to claim 39 wherein the determined value is quantitatively indicative of the physical parameter.

41. Computer software for fingerprint authentication according to claim 39 wherein the comparison process uses a biometric template selected in dependence upon the determined value, different biometric templates selected for different determined values.

42. Computer software for fingerprint authentication according to claim 41 wherein the comparison process includes:
   c1) selecting an image-processing process in dependence upon the determined value;
   c2) according to the selected image-processing process, processing the image to remove a subset of features contained therein; and,
   c3) comparing the processed image to the selected biometric template, wherein the biometric template is processed according to a same selected image-processing process prior to being selected for comparison.

43. Computer software for fingerprint authentication according to claim 41 wherein the comparison process includes:
   c1) selecting an image-processing process in dependence upon the determined value;
   c2) according to the selected image-processing process, processing the image to remove a subset of features contained therein;
   c3) according to the selected image-processing process, processing the selected biometric template to remove a subset of features contained therein; and,
   c4) comparing the processed image to the processed selected biometric template.

44. Computer software for fingerprint authentication according to claim 41 wherein the biometric templates are of the plurality of biometric templates stored in association with a moisture condition of the fingertip.

45. Computer software for fingerprint authentication according to claim 41 wherein the biometric template is selected from a plurality of biometric templates, each biometric templates being of the plurality of biometric templates stored in association with an applied pressure of the fingertip.

46. Computer readable medium having thereon computer software for fingerprint authentication of an image of a fingerprint of an individual, said computer software comprising:
   computer executable instructions for processing the image to determine a value indicative of a physical parameter of the fingertip, the physical parameter affecting the acquired image and being independent of the identity of the individual;
   computer executable instructions for processing the acquired image according to a predetermined image-processing process to remove a subset of features from the acquired image, the predetermined image-processing process involving different image processing steps for different determined values;
   computer executable instructions for selecting a biometric template in dependence upon the determined value, the biometric template being processed according to the predetermined image-processing process;
   computer executable instructions for comparing the process acquired image to the biometric template; and
   computer executable instructions for performing one of an authentication and a rejection in dependence upon the comparison.

47. Computer software for fingerprint authentication according to claim 46 further comprising:
   computer executable instructions for providing a plurality of biometric template images of a same fingertip, each biometric template image associated with a different predetermined physical parameter of a specific fingertip, the physical parameter affecting the acquired image and independent of the identity of the individual, wherein each biometric template image is processed according to the predetermined image processing process.

48. Computer software for fingerprint authentication according to claim 47 wherein the determined physical parameter is an applied pressure of the fingertip.

49. Computer software for fingerprint authentication according to claim 48 wherein providing a plurality of biometric template images of a same fingertip includes repeating for each predetermined applied pressure:
   placing the fingertip onto a sensing surface using the predetermined applied pressure; and,
   capturing an image of the fingertip.

50. Computer software for fingerprint authentication according to claim 46 wherein the determined physical parameter is a moisture condition of the fingertip.

51. Computer software for fingerprint authentication according to claim 50 wherein providing a plurality of biometric template images of a same fingertip includes repeating for each predetermined moisture condition:
   conditioning the fingertip to be in the predetermined moisture condition;
   placing the conditioned fingertip onto a sensing surface; and,
   capturing an image of the conditioned fingertip.

* * * * *

UNITED STATES PATENT AND TRADEMARK OFFICE
CERTIFICATE OF CORRECTION

PATENT NO. : 7,272,247 B2 Page 1 of 1
APPLICATION NO. : 09/973011
DATED : September 18, 2007
INVENTOR(S) : Laurence Hamid It is certified that error appears in the above-identified patent and that said Letters Patent is hereby corrected as shown below:

Column 8,
Line 44, after "forth" insert -- . --.

Column 12,
Line 54, delete "134" and insert -- 136 --.

Column 13,
Line 9, after "7b" insert -- , --.

Signed and Sealed this

Twenty Second Day of April, 2008

JON W. DUDAS
*Director of the United States Patent and Trademark Office*